Feb. 1, 1955 H. A. WELLS 2,700,808
DROP WIRE CLAMP
Filed Dec. 16, 1950 3 Sheets-Sheet 1
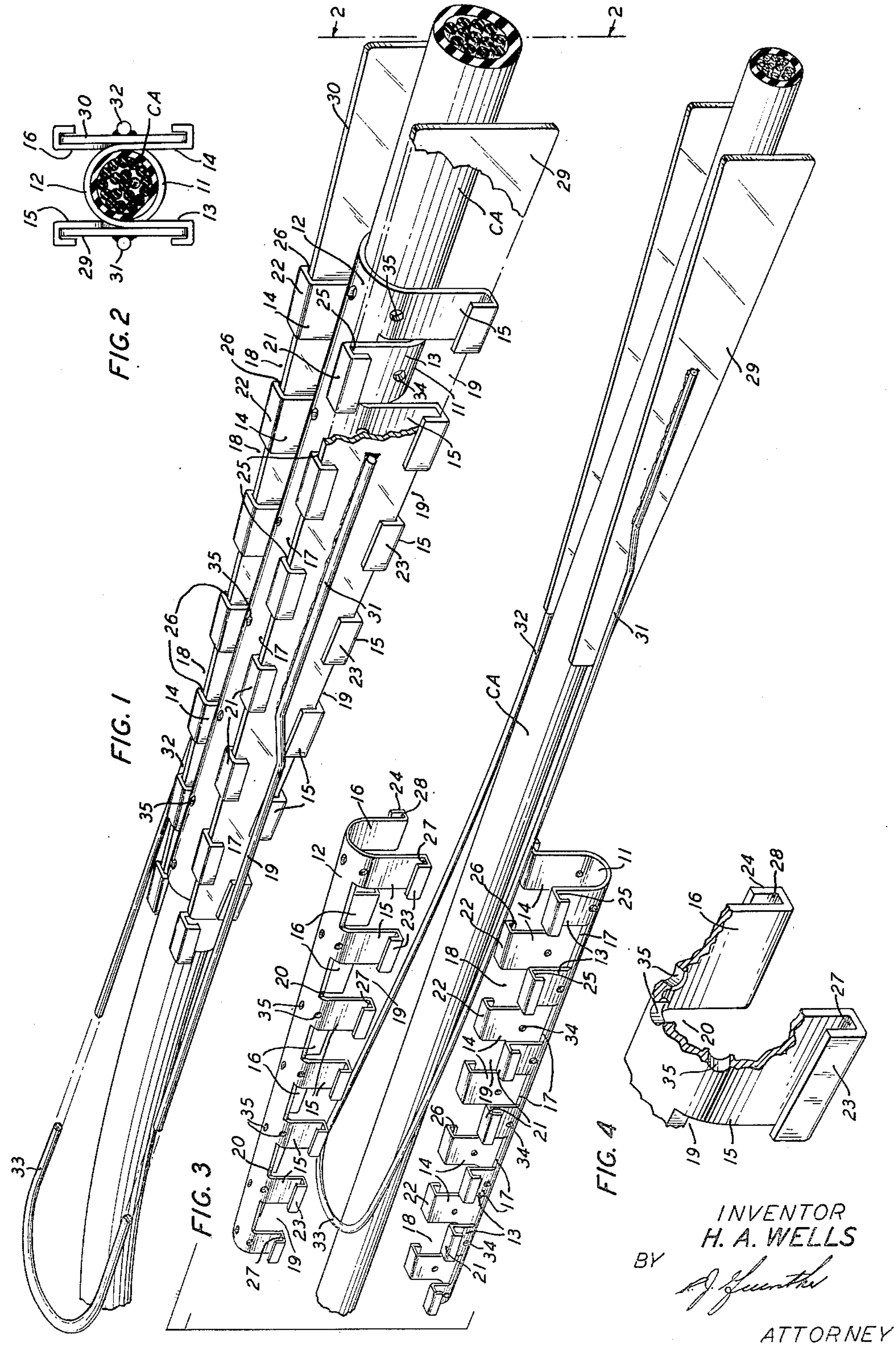

DROP WIRE CLAMP
Filed Dec. 16, 1950 3 Sheets-Sheet 2
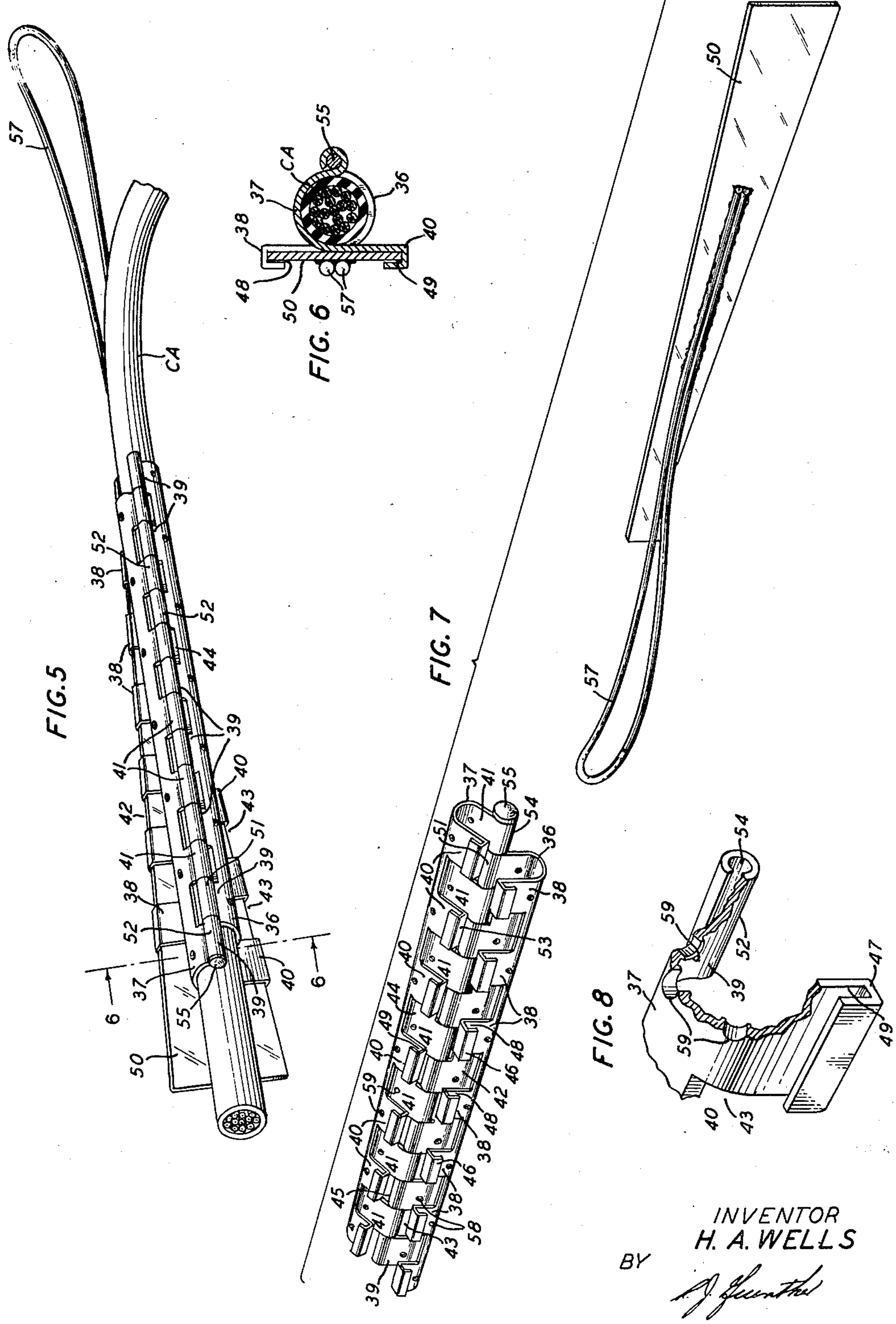
INVENTOR
H. A. WELLS
BY
[signature]
ATTORNEY Feb. 1, 1955 H. A. WELLS 2,700,808
DROP WIRE CLAMP
Filed Dec. 16, 1950 3 Sheets-Sheet 3
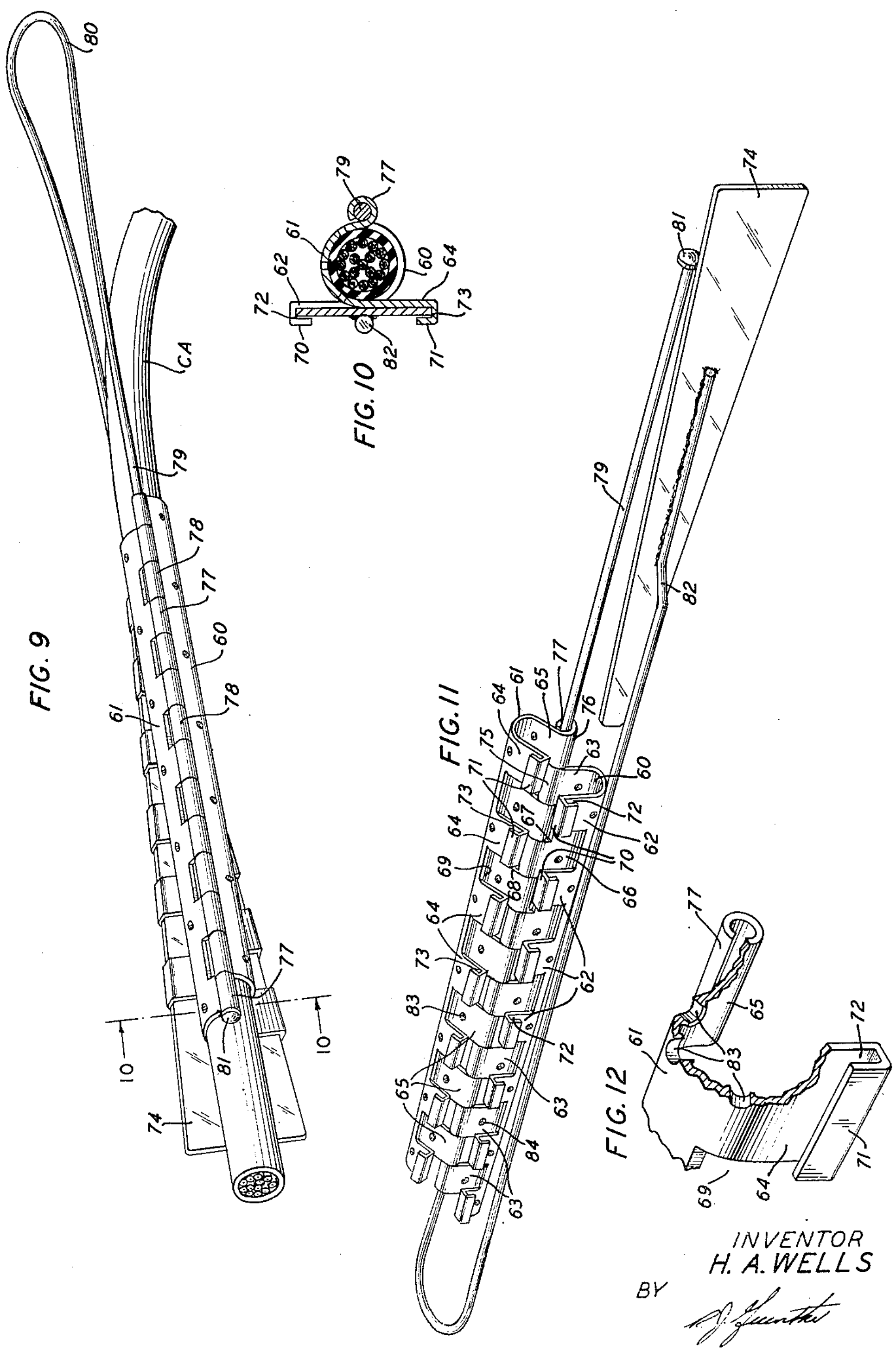
INVENTOR
H. A. WELLS
BY
ATTORNEY 2,700,808
Patented Feb. 1, 1955

2,700,808

DROP WIRE CLAMP

Herbert A. Wells, Rutherford, N. J., assignor to Bell Telephone Laboratories, Incorporated, New York, N. Y., a corporation of New York Application December 16, 1950, Serial No. 201,126

3 Claims. (Cl. 24—136)

This invention relates to securing devices and more particularly, to devices known as drop wire clamps which are employed for supporting wires, especially those used for securing electrical conductors to supports.

One primary object of this invention is the provision of an efficient, readily applicable wire securing device or clamp, of the friction type, which will securely grip the insulating jacket of the wire or cable positioned therein in such a manner that no slippage will occur and that the insulation and jacket enclosing the conductors will not be damaged.

In one preferred embodiment of the invention, the clamping device comprises a pair of elongated trough-shaped members, provided with spaced apart graduated legs along the parallel edges thereof. The pressure exerted by the clamping device is not concentrated at any particular point but embraces the insulating jacket substantially uniformly over the entire surface of the wire or cable jacket confined in the device.

The width of the legs and the spaces between them are of substantially the same dimensions, which permits the members to intermesh to provide a central bore of substantially circular cross section. The ends of the legs are provided with return bend portions to provide hooks or channel portions, for the reception of a pair of flat, wedge-shaped members. These members when positioned in the channel portions slide thereinto, due to tension applied as by a supporting loop, cause the central space to constrict and the members to firmly grip the jacket of the wire or cable.

In another embodiment of the invention, the elongated trough-shaped members are hingedly connected together along one edge thereof and a single flat wedge, having a supporting loop secured thereon, is provided for forcing the two members together to constrict the central space and confine the wire or cable positioned therein.

In a further embodiment, the elongated trough-shaped members are hingedly connected together, by means of one leg of the supporting loop which is slidably mounted therein. The other leg of the supporting loop is secured to a flat, wedge-like member which is adapted to be slidably positioned in the legs for forcing the two members together to constrict the central space and confine the wire or cable positioned therein.

In order to increase the holding power of the device, upset or burred perforations are provided along the length of the trough-shaped members.

The invention will be more readily understood from the following detailed description when read in connection with the accompanying drawings, of which:

Fig. 1 is a perspective view, partly in section, showing a preferred embodiment of the securing device of this invention with a fragment of a multiconductor insulated cable positioned therein;

Fig. 2 is an end view of Fig. 1 looking in the direction of the arrows 2—2 in Fig. 1;

Fig. 3 is an exploded view of the device shown in Fig. 1;

Fig. 4 is a fragmentary end view in perspective of one of the clamping members with a portion broken away to disclose the burred perforations;

Fig. 5 is a perspective view, of another form of the wire securing device of this invention;

Fig. 6 is a cross-sectional view taken on line 6—6 of Fig. 5;

Fig. 7 is an exploded view of the device shown in Fig. 5;

Fig. 8 is a fragmentary end view, in perspective, of one of the clamping members shown in Figs. 5 and 7, with a portion broken away to show the burred perforations;

Fig. 9 is a perspective view of a further embodiment of the invention;

Fig. 10 is a cross-sectional view taken on line 10—10 of Fig. 9;

Fig. 11 is an exploded view of the device shown in Fig. 9; and

Fig. 12 is a fragmentary end view, in perspective, of one of the clamping members shown in Figs. 9 and 11 with a portion broken away to show the burred perforations.

Referring now to the drawings, and with particular reference to Figs. 1 and 3, the numerals 11 and 12 indicate elongated trough-shaped body members of like configuration, constructed preferably from sheet metal, and provided along their edges with extending leg portions 13, 14, 15 and 16, which are of graduated length to provide a uniform taper from one end of the body member to the other. The legs 13, 14, 15 and 16 are spaced apart to provide openings 17, 18, 19 and 20, therebetween; these openings are slightly wider than the width of the legs to permit the intermeshing thereof.

The extremities of the legs 13, 14, 15 and 16, are provided with return bend portion 21, 22, 23 and 24, to form longitudinally extending channels or guides 25, 26, 27 and 28, for the reception of the wedge members 29 and 30.

As shown in Fig. 1, the two body members 11 and 12 are fitted together so that the legs 13, 14, 15, and 16, register with openings 17, 18, 19 and 20, to provide a substantially closed central bore or space, when the wedge members 29 and 30 are positioned in the guides 25, 26, 27 and 28, of the legs 13, 14, 15 and 16, on the body members 11 and 12. Secured to the wedge members 29 and 30 are the ends 31 and 32 of the supporting loop 33 which extends beyond the narrower ends of the wedge members 29 and 30.

It will be observed that when the two members 11 and 12 are intermeshed, as shown in Figs. 1 and 2, and the wedges 29 and 30 positioned in the guides, and tension is applied to the loop 33, the wedges will slide longitudinally in the guides in the direction of the pull and due to the graduated length of the legs 13, 14, 15 and 16, the members 11 and 12 will be forced toward each other and the central bore formed by these two members will be caused to constrict. Thus the members will firmly grip the cable CA positioned therein, with a uniform pressure on that part of the cable confined between the members 11 and 12. To increase the holding power of the device, burred perforations 34 and 35 are provided in the body members 11 and 12.

In the embodiment of the invention shown in Figs. 5 to 8, the numerals 36 and 37 indicate elongated trough-shaped body members similar to those disclosed in Figs. 1 and 3, and are of like configuration, are constructed preferably of sheet metal and are provided along their edges with extending leg portions 38 and 40, which are also of graduated length to provide a uniform taper from one end of the body member to the other. The legs 38, 39, 40 and 41, are spaced apart to provide openings 42, 43, 44 and 45, therebetween, which are slightly wider than the width of the legs.

The extremities of the legs 38 and 40 are provided with return bend portions 46 and 47, to form the channel or guide 48 and 49 for the reception of the wedge member 50. The legs 39 and 41 are of uniform length and are provided at their extremities with return bend portions 51 and 52, to provide the tubular portions 53 and 54, for the reception of the rod or pin 55 which is positioned in the aligned bores of the tubular portions 53 and 54 and acts as a hinge pin for the members 36 and 37.

As shown in Fig. 5, the two body members 36 and 37 are hinged together along one edge by means of the return bend portions 51 and 52 on the legs 39 and 41, and the longitudinally extending pin 55. Upon closure of the two mating body members 36 and 37, the legs 38 and 40 will intermesh with the openings 42 and 45 in the body members 36 and 37 to provide a longitudinal wire receiving bore of substantially circular cross section. When the two body members 36 and 37, are closed as above described and intermesh, as shown in Fig. 6, the guides 48 and 49 on the legs 38 and 40 are in substantial alignment and permit the wedge member 50 to be slidably positioned therein. Secured to the wedge member 50 is the supporting loop 57 which may be welded or otherwise secured thereto.

It is therefore apparent that when the two members 36 and 37 are closed and intermeshed as shown in Figs. 5 and 6, and the wedge member positioned in the guides 48 and 49, on the legs 38 and 40, and tension is applied to the loop 57, the wedge will slide longitudinally in the guides 48 and 49 in the direction of the pull and due to the configuration of the wedge 50 and the graduated length of the legs 38 and 40 the body members 36 and 37 will be forced toward each other and the central bore formed by these two members will be caused to constrict. Thus the cable CA positioned therein will be gripped firmly and with a uniform pressure on that part of the cable confined between the members 36 and 37. In order to increase the holding power of the device, burred perforations 58 and 59 are provided in the body members 36 and 37.

In the embodiment shown in Figs. 9 to 12, the structure is similar to that shown in Figs. 5 and 6, in that device is of the hinged type and employs a single wedge. As shown, the numerals 60 and 61 indicate elongated trough-shaped members substantially the same as those shown in Figs. 5 and 6, are of like configuration and are preferably made from sheet metal and are provided along their edges with extending legs 62, and 64 which as described with respect to Figs. 5 and 7, are of graduated length to provide a uniform taper from one end of the body member to the other. As shown the legs 62, 63, 64 and 65, are also spaced apart and provide openings 66, 67, 68 and 69, therebetween, slightly wider than the width of the leg.

The extremities of the legs 62 and 64, terminate in the return bend portions 70 and 71 to form the guides 72 and 73 for the reception of the wedge member 74. The extremities of the legs 63 and 65 are of uniform length and terminate in the return bend portions 75 and 76 to provide the tubular portions 77 and 78 for the reception of the free end 79 of the supporting loop 80, which acts as a hinge pin for the members 60 and 61 and is slidably positioned in the aligned bores of the tubular portions 77 and 78.

As shown in Fig. 11, the body members 60 and 61, like those in Figs. 5 and 7, are hinged together along one edge by means of the tubular portions 77 and 78 and the free end 79 of the loop 80, which is provided with a headed portion 81 and is slidable with respect to the body members 60 and 61. The other end 82 of the loop 80 is secured to the wedge member 74. Upon closure of the two mating body members 60 and 61, the legs 62 and 64 will intermesh with the openings 69 and 66 in the body members 60 and 61 to provide a longitudinal wire receiving bore of substantially circular cross section.

When the two body members 60 and 61 are closed as above described and intermeshed, as shown in Figs. 9 and 10, the guides 72 and 73 on the legs 62 and 64 are in substantial alignment and permit the wedge member 74, to be slidably positioned therein while the end portion 79 of the loop 80 slides in the tubular portions 77 and 78 of the legs 63 and 65.

From the foregoing it will be observed that when the two body members 60 and 61 are closed and intermeshed, as shown in Figs. 9 and 10, and the wedge member 74 positioned in the guides 72 and 73, and tension is applied to the loop member 80, the wedge will slide longitudinally in the guides 72 and 73 and the end portion 79 of the loop 80 will also slide in the tubular portions 77 and 78, in the direction of the pull. Due to the tapered configuration of the wedge 74 and the graduated length of the legs 62 and 64 the body members 60 and 61 will be forced toward each other and the central bore formed by these two members will be caused to constrict whereby the cable CA positioned therein will be gripped firmly as heretofore described with respect to Figs. 5, 6 and 7. In order to increase the holding power of the device, burred perforations 83 and 84 are provided in the body members 60 and 61.

While I have shown and described preferred embodiments of my invention, it is to be understood that various changes and modifications may be made therein without departing from the scope and spirit of the invention.

What is claimed is:

1. A clamp for supporting insulated electrical conductors comprising a pair of elongtated body members, each of said body members being substantially semicircular in configuration and terminating on opposite sides in a plurality of spaced opposed parallel extending legs having return bent portions formed at the ends thereof, said legs being of gradually extending length from one end of said body member to the other to provide a tapered configuration, whereby when said body members are placed on opposed sides of the electrical conductor said legs extending from opposite sides of each said body member will intermesh with and extend beyond said legs from said other body member, a pair of wedge-shaped members having substantially the same tapering as said extending legs and each slidable within said return bent portions of said intermeshed legs, whereby when said wedge-shaped members are positioned in place said body members will exert a substantially even gripping pressure on the conductor throughout the length of said body members, and means interconnecting said wedge-shaped members and extending beyond the narrower ends thereof for positioning them in place in said return bent portions of said legs.

2. A clamp for supporting insulated electrical conductors comprising a pair of elongated body members, each of said body members being substantially semicircular in configuration and terminating on opposite sides in a plurality of spaced opposed parallel extending legs having return bent portions formed at the ends thereof, said legs being of gradually extending length from one end of said body member to the other to provide a tapered configuration, whereby when said body members are placed on opposed sides of the electrical conductor said legs extending from opposite sides of each said body member will intermesh with and extend beyond said legs from said other body member, perforations formed in said semicircular body members to increase the gripping of said body members on the conductor, a pair of wedge-shaped members having substantially the same tapering as said extending legs and each slidable within said return bent portions of said intermeshed legs, whereby when said wedge-shaped members are positioned in place said body members will exert a substantially even gripping pressure on the conductor throughout the length of said body members, and means interconnecting said wedge-shaped members and extending beyond the narrower ends thereof for positioning them in place in said return bent portions of said legs.

3. A clamp for supporting insulated electrical conductors comprising a pair of elongated body members, each of said body members being substantially semicircular in configuration and terminating on opposite sides in a plurality of spaced opposed parallel extending legs having return bent portions formed at the ends thereof, said legs being of gradually extending length from one end of said body member to the other to provide a tapered configuration, whereby when said body members are placed on opposed sides of the electrical conductor said legs extending from opposite sides of each said body member will intermesh with and extend beyond said legs from said other body member, a pair of wedge-shaped members having substantially the same tapering as said extending legs and each slidable within said return bent portions of said intermeshed legs, whereby when said wedge-shaped members are positioned in place said body members will exert a substantially even gripping pressure on the conductor throughout the length of said body members, and a loop interconnecting said wedge-shaped members and extending beyond the narrower ends thereof for positioning them in place in said return bent portions of said legs.

References Cited in the file of this patent

UNITED STATES PATENTS

| | | |
|---|---|---|
| 32,210 | Soule | Apr. 30, 1861 |
| 141,579 | Mehu | Aug. 5, 1873 |
| 201,605 | Fitzhugh | Mar. 26, 1878 |
| 319,591 | Magee | June 9, 1885 |
| 715,222 | Werth | Dec. 2, 1902 |
| 809,327 | Rieske | Jan. 9, 1906 |
| 1,656,226 | Palm | Jan. 17, 1928 |
| 1,793,140 | Steinmayer | Feb. 17, 1931 |
| 1,817,473 | Bailey | Aug. 4, 1931 |
| 2,073,338 | Durkee | Mar. 9, 1937 |

FOREIGN PATENTS

| | | |
|---|---|---|
| 5,346 | Great Britain | Mar. 10, 1908 |